United States Patent [19]
Moore et al.

[11] 3,865,531
[45] Feb. 11, 1975

[54] BLOW MOLDS FOR MAKING CONTAINERS HAVING RECESSED BOTTOMS

[75] Inventors: Lawrence A. Moore, Rockford, Ill.; Donald R. Welty, Beloit, Wis.

[73] Assignee: Beloit Corporation, Beloit, Wis.

[22] Filed: Mar. 16, 1973

[21] Appl. No.: 342,042

[52] U.S. Cl. ........................ 425/387 B, 425/DIG. 216, 425/DIG. 233
[51] Int. Cl. .................................................. B29d 23/03
[58] Field of Search .......... 425/DIG. 214, DIG. 206, 425/326 B, 324 B, 387 B, DIG. 216, 342, DIG. 233

[56] References Cited
UNITED STATES PATENTS

| | | | |
|---|---|---|---|
| 3,050,773 | 8/1962 | Hagen | 425/DIG. 214 X |
| 3,198,861 | 8/1965 | Marvel | 425/DIG. 214 X |
| 3,399,424 | 9/1968 | Sheptak | 425/DIG. 214 |
| 3,555,134 | 1/1971 | Marcus | 425/326 B X |
| 3,781,395 | 12/1973 | Uhlig | 425/DIG. 214 X |

*Primary Examiner*—Francis S. Husar
*Assistant Examiner*—David B. Smith
*Attorney, Agent, or Firm*—Larson, Taylor and Hinds

[57] ABSTRACT

An apparatus for blow molding containers having a closed recessed end such as a "champagne" bottle bottom. A parison is first formed in a mold cavity into a blown article of a shape comprising a tubular portion having an outwardly convex closed end. The tubular portion is then cooled while the convex end is heated and then moved into the tubular portion whereupon its curvature is reversed as it becomes a recessed outwardly concave end. The mold may comprise a tubular section, a heated, separately retractable neck section, and an end section which pinches off the parison and is movable into the tubular section after retraction of the neck section for inward movement of the convex end.

11 Claims, 11 Drawing Figures

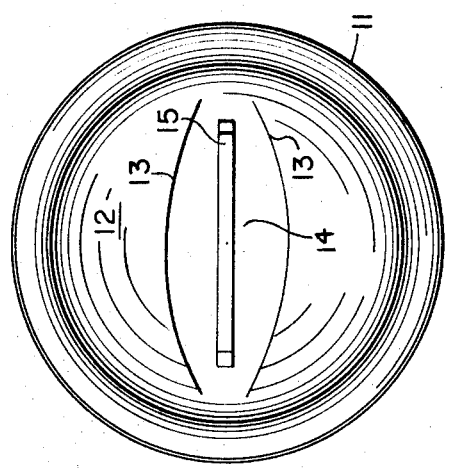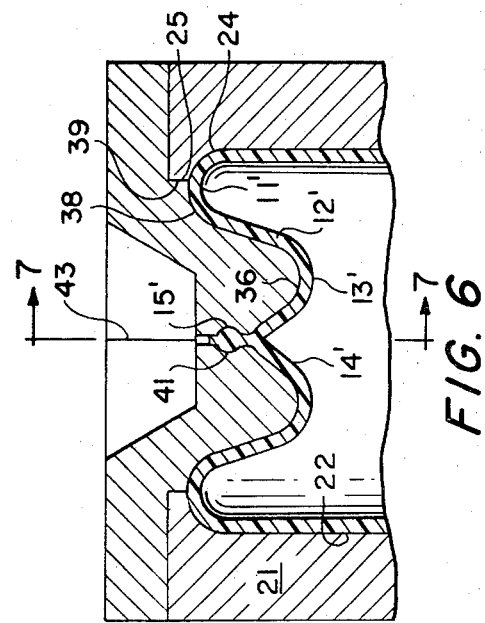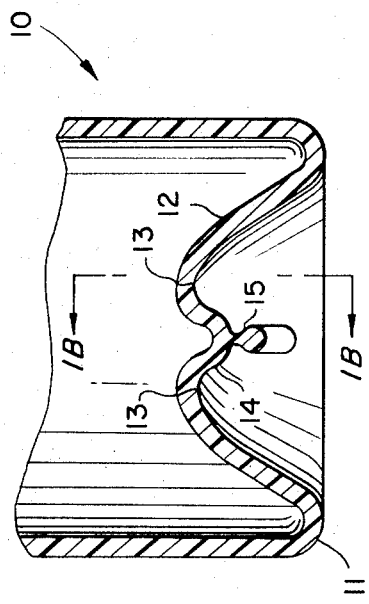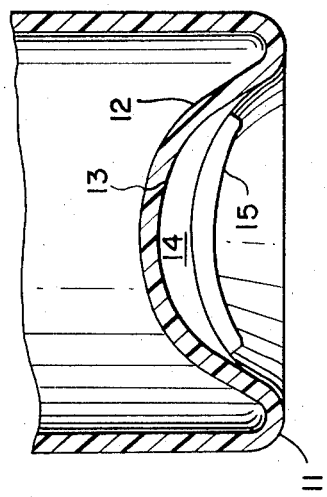

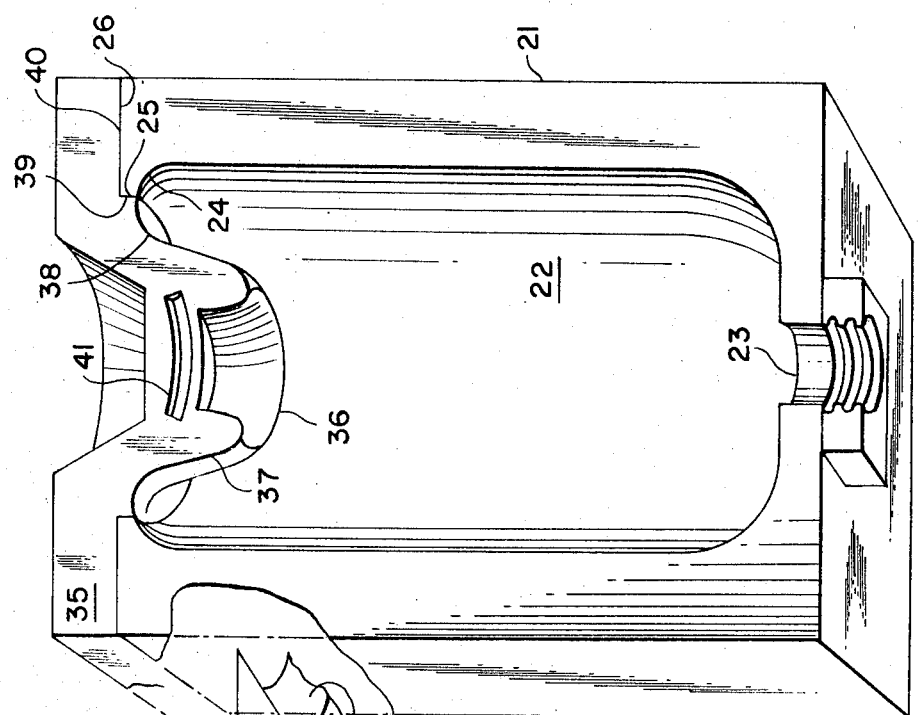
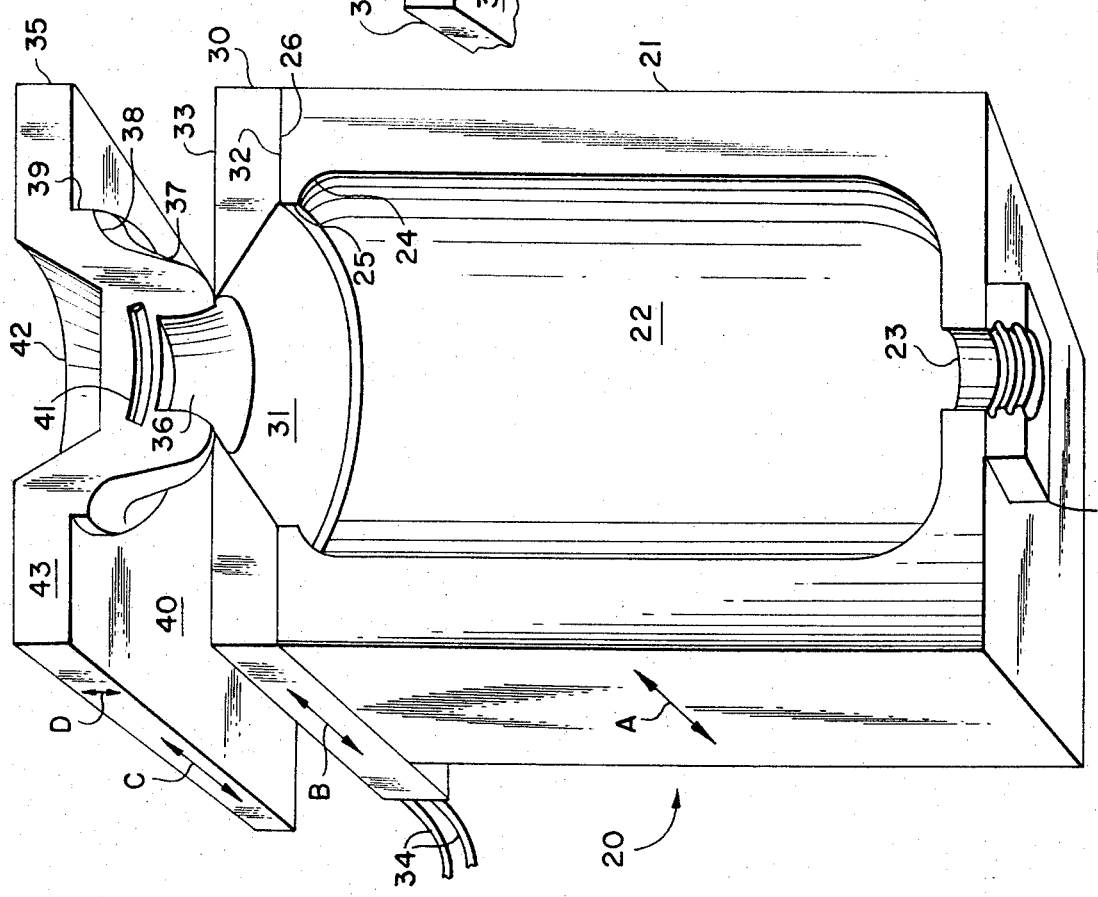
FIG. 3
FIG. 2

BLOW MOLDS FOR MAKING CONTAINERS HAVING RECESSED BOTTOMS

BACKGROUND OF THE INVENTION

This invention relates to blow molding, and in particular it relates to a new and improved method and apparatus for blow molding containers or the like having a recessed bottom commonly referred to as a "champagne" bottle bottom.

A recessed "champagne" bottle bottom container is particularly useful where the contents of the container are packaged under pressure. A typical example, in addition to a champagne bottle, would be a carbonated beverages bottle.

Special problems are encountered when attempting to impart such a shape to a plastic container made by blow molding. According to customary blow molding techniques, a preform, usually a tubular parison, is placed within a mold cavity whereupon an outward pressure differential across the parison, usually caused by introducing pressurized air into the parison, forces the parison against the walls of the mold cavity which are in the shape of the finished article. According to presently known techniques for forming recessed bottom bottles by blow molding, that portion of the blow mold cavity corresponding to the recessed bottom of the bottle includes a central inwardly projecting member about which the parison must be expanded to form the recessed bottom. However, this technique has the disadvantage that it is not possible to expand the material of the parison axially into the space between the side of the inwardly projecting member and the opposing side wall of the cavity without undesirable thinning of the parison material in this space.

Thus, there exists a need for a new and improved procedure for forming recessed or "champagne" bottom containers by the blow molding technique.

SUMMARY OF THE INVENTION article. According

Thus, it is a purpose of the present invention to provide a new and improved method and apparatus for forming recessed or "champagne" bottom containers.

According to the present invention, a parison is formed into a recessed bottom container in two steps. During the first step, the parison is blown into a shape having a tubular portion and an outwardly convex end portion. This end portion is then moved into the tubular portion whereby its curvature is reversed and it becomes an outwardly concave end which terminates at the juncture between the outermost portion of this concave end and the end of the tubular portion, which juncture thereby forms the resting bottom surface of the container.

In accordance with a preferred embodiment of the present invention, the parison is blown into said shape including a tubular portion and an outwardly convex end within a mold cavity comprising a tubular section in which the tubular portion of the container is formed, an end section at the outermost end of the convex portion and a neck section between the tubular and end sections. The neck section and the end section form the convex end and preferably the end section includes means for pinching off the parison. The neck section is retractable laterally, to make room for the end section to move axially into the tubular section for changing the said convex end into a concave recessed end.

In accordance with a preferred method of operation of the present invention, the parison is first blown into the said article having a tubular portion and a convex end. The tubular portion is cooled off a sufficient amount so that the tubular portion will become at least semi-rigid and the pressure in the blown article is exhausted. Meanwhile the sides of the convex end are kept heated, preferably by heating the retractable neck section so that this portion of the convex end remains soft. The neck section is then retracted laterally out from between the end and tubular sections leaving room for the end section to move axially into the tubular section, carrying with it the convex end of the blown article, whereby the convex end is reversed and becomes the outward concave end or "champagne" bottom of the container.

The mold sections of the present invention can be held by and hence are adapted to use with virtually any type of blow molding apparatus. For example, the mold halves themselves can assume any orientation, and the parisons may be hot parisons received directly from an extruder or cold parisons which have been previously extruded, cooled, stored and then preheated just prior to the blow molding operation. Further, the heated parison may or may not be stretched just prior to blow molding to bi-axially orient the material thereof. However, in a preferred arrangement, the mold may be adapted for use with an apparatus as shown in U.S. Pat. No. 3,756,813. In this apparatus, the parisons, after having been heated in an oven, are grasped near the upper ends thereof by gripping means which place the open lower end of the parison down onto an air plug between a pair of thread dies which clamp the lower end against the air plug and preferably form a threaded container opening thereat. The parison is closed off toward the upper end thereof whereby the container is blow molded upside-down, i.e., with the container opening facing downwardly. In a preferred arrangement, after the lower end of the parison has been clamped at its lower end, the grippers are raised upwardly to stretch the parison just before the mold halves close onto the parison.

Thus, it is an object of the present invention to provide a new and improved method and apparatus for making recessed end containers by the blow molding technique.

It is another object of the invention to provide a new and improved method and apparatus for making recessed end containers by the blow molding technique, according to which the article is formed in two steps, during the first of which steps a parison is blown into a shape comprising a tubular portion and a convex end, and during the second of which steps the convex end is moved axially into the tubular portion.

It is another object of this invention to provide a new method for blow molding recessed end containers according to which a parison is first blown into the shape of a tubular portion having a convex end, after which the tubular portion is cooled while the convex end is kept heated, after which the heated, soft convex end is moved into the cooled at least semi-rigid tubular portion.

It is another object of this invention to provide an apparatus for blow molding recessed bottom containers according to which a mold cavity comprises a tubular section, an end section for engaging the end of the parison and preferably closing it off, and a neck section located between the tubular and end sections, the neck section being heatable for heating the convex end of the blown article, after which the neck section can be laterally retracted, providing an area for axial movement of the end section into the tubular section.

Other objects and the advantages of the present invention will become apparent from the detailed description to follow, together with the accompanying drawings.

BRIEF DESCRIPTION OF THE DRAWINGS

There follows a detailed description of a preferred illustrative embodiment of the invention which is to be read together with the accompanying drawings in which:

FIG. 1A is a cross-sectional view through a container having a recessed end formed in accordance with the present invention.

FIG. 1B is a sectional view taken along line 1B—1B of FIG. 1A.

FIG. 1C is a bottom view of the container of FIGS. 1A and 1B.

FIG. 2 is a perspective view from below of one half of the mold assembly of the present invention, the other half of the mold being identical thereto.

FIG. 3 is a perspective view from below of the same assembly as shown in FIG. 2 but with the parts thereof in a different position.

FIG. 6 is a cross-sectional view taken in the same plane as FIGS. 5A and 5B but showing the mold assembly with the elements in the position as shown in FIG. 3.

DETAILED DESCRIPTION OF THE PREFERRED EMBODIMENT

Figure 4B:
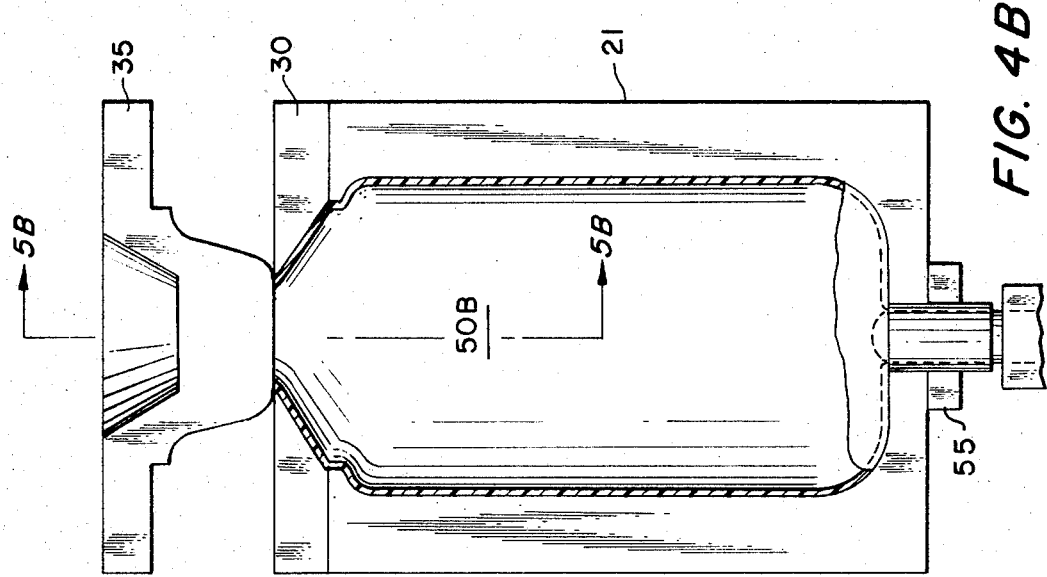
FIGS. 4A and 4B are front elevation views of a mold half with the elements in the position as shown in FIG. 2 but when the mold is closed, the two figures showing two different stages in the operation of the apparatus.

Referring now to the drawings, like elements are represented by like numerals throughout the several views.

A container 10 having a recessed or "champagne" bottle bottom is shown in FIGS. 1A–1C. The container includes a lower edge 11 extending completely around the circumference of the container. The recessed or downwardly concave end includes an upswing portion 12 which extends upwardly from the lower edge 11 essentially on the two sides of the pinch-off bead 15 up to high points 13.

FIGS. 2 and 3 illustrate the same one-half of a mold assembly constructed in accordance with the present invention, it being understood that the opposite mold half is identical to the half shown in the figures. FIG. 3 differs from FIG. 2 only in that it shows the elements of the mold in a different position.

Referring now to FIG. 2, there is shown a mold assembly 20 including a main or tubular mold section 21 having formed therein a recess 22 shaped to form one-half of the essentially tubular portion of the article to be blown. An opening 23 is provided for receiving an air plug 52 (see FIG. 4A). A thread die half 27 is shown just beneath the opening 23. In practice, these dies will be operable separately from the mold halves as shown in the said U.S. Pat. No. 3,765,813. The recess 22 includes a shoulder 24 terminating at a vertical wall 25. The mold section 21 includes a top surface 26. This mold section is movable in the conventional manner towards and away from the plane on which the two mold halves meet, as indicated by the double arrow A in FIG. 2.

The assembly 20 includes a further section 30 which serves as a neck section between the section 21 and an end section 35 (which will be discussed in greater detail below). The neck section 30 includes an upwardly inwardly sloping interior surface 31, and lower and upper surfaces 32 and 33, respectively. This section 30 is capable of being heated and for this purpose lines 34 are shown in the figure. Any suitable heating means may be employed such as electric, hot waater or steam. The heating means is thus well known per se and will not be shown in detail. The lines 34 are thus schematic representations of means for providing any one of the above described types of heating. The purpose for this heating is to keep heated the portion of an expanded parison resting against the surface 31. The section 30 is movable laterally in the direction as indicated by the double arrow B. This section can be moved in said directions either with the section 21 or independently thereof.

The assembly 20 further includes an end mold section 35 having a curved axially projecting end 36, and an outwardly upwardly sloping portion 37 which extends all about the periphery of this end section. This smooth curved portion 37 merges with a shoulder portion 38 which then terminates at a vertical wall 39. The plane surface 43 lies in the plane on which the mold halves meet and hence this surface 43 lies flat against the corresponding surface of the opposite end section 35 when the mold is closed. To provide a space for the grippers which grip the top of the parison (See FIGS. 5A, 5B), this end section 35 is cut out at 42. A recess 41 is provided for receiving the pinch-off bead of the parison. The section 35 is movable towards and away from the plane along which the mold halves meet, as indicated by the double arrow C. In addition, this section is movable axially as indicated by the double arrow D so that the axially projecting portion of section 35 can move into the recess 22 of tubular section 21.

FIG. 3 illustrates the second basic position of the mold elements, the purpose for which will be explained in greater detail below. In this second position it will be noted that the neck section 30 has been completely retracted laterally out of the way after which the end section 35 has moved into the recess 22 so that the vertical walls 25 and 39 face each other so that the shoulder portions 24 and 38 form a smooth curve.

The method of operation of the present invention will now be described with reference to FIGS. 4–7. A tubular parison is first introduced into the space between the separated mold halves. As noted earlier, the parison can be provided in any number of ways. For example, it can be received directly from an extruder or it can be a cold parison which has just been reheated in a parison heating oven. Further, while the parison need not be stretched, it has been found that the properties of the parison are enhanced if the parison is stretched longitudinally to bi-axially orient the same before the molding step. When operating the apparatus by the blow molding apparatus as shown in the said U.S. Pat. No. 3,765,813, the heated parison is held at its upper end by grippers 51. The lower end of the parison is placed onto an air plug 52 between halves of a thread die 55. In accordance with a preferred procedure, the thread dies are then clamped onto the lower end of the parison after which the grippers 51 are raised to stretch the parison. The mold halves are then closed onto the parison. The parison at this stage is designated by the numeral 50A and is shown in FIGS. 4A and 5A. In this condition, it will be noted that the mating cavities 41 have closed against the upper portion of the parison 50A, thereby effectively pinching off the parison to separate the portion thereof within the mold from the scrap piece located thereabove and held by the grippers 51.

Figure 4A:
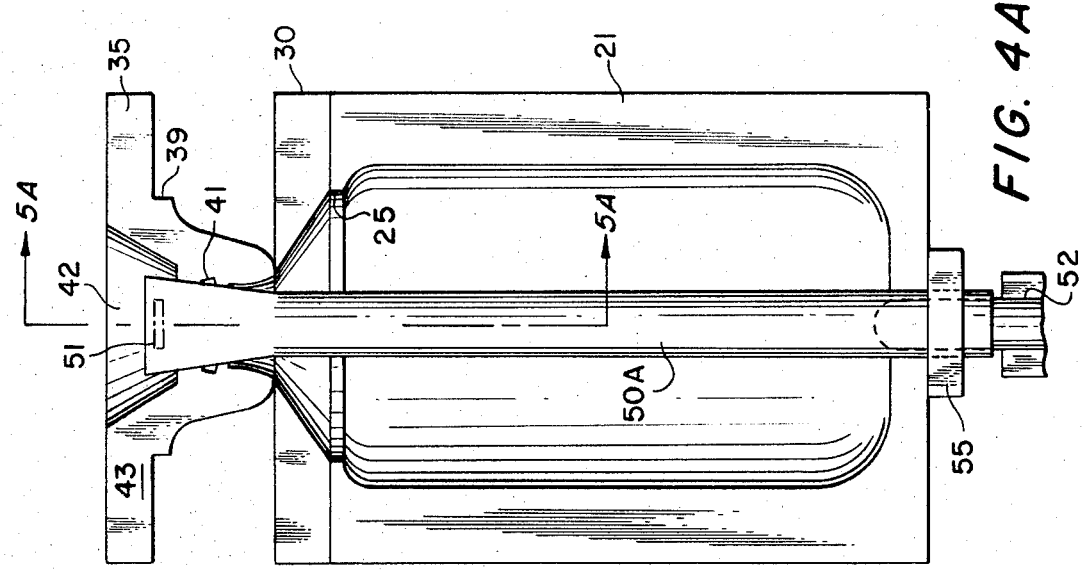
Figure 5A:
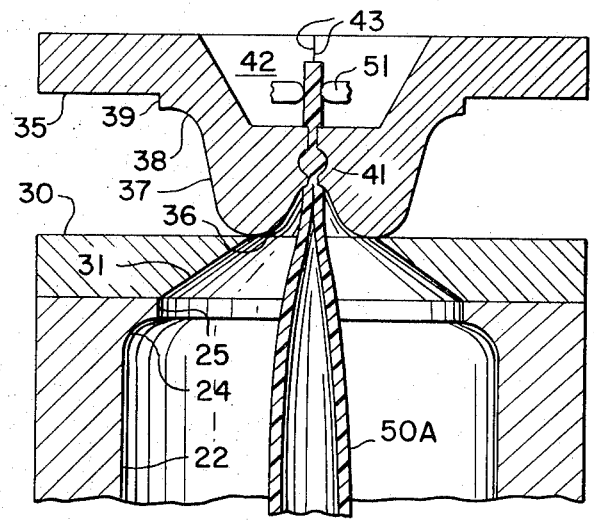
FIGS. 5A and 5B are cross-sectional views taken along lines 5A—5A and 5B—5B of FIGS. 4A and 4B, respectively.
Figure 5B:
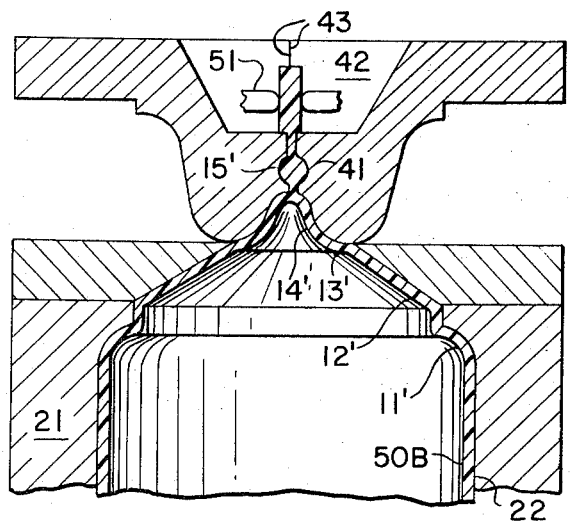

Next, air is introduced through the air plug 52, blowing the parison to fill the mold cavity 22 as shown in FIGS. 4B and 5B, and the blown article is represented by the numeral 50B. Referring in particular to FIG. 5B, it will be noted that the blown article 50B includes a tubular portion resting against the interior of recess 22 and an outwardly convex end. The numerals 11'–15' are used in FIG. 5B (and also FIGS. 6 and 7 to be discussed below), to represent the corresponding portions of the convex end which ultimately become the said portions 11–15 respectively of FIGS. 1A–1C.

The convex end includes a portion 12' which lies against the surface 31 of mold section 30 plus end portions 13' and 14' which rest against that portion of mold end section 35 which is inside the mold. Finally, the pinch-off 15' is shown within the recess 41.

At this time, the tubular portion within recess 22 is permitted to cool while the section 12' remains heated because of its contact with the heated neck section 30. After a point has been reached where the tubular portion of blown article 50B is at least semi-rigid while the portion 12' of the convex end is still hot and soft, the pressurized fluid within blown article 50B is released. The mold sections 30 are then retracted laterally and the mold sections 35 are moved downwardly into the recess 22 until the lower surface 40 of each mold sections 35 abuts the upper surface 26 of mold section 21 whereupon the shoulders 24 and 38 will form a smooth curve as the vertical walls 25 and 39 face each other. This is the FIG. 3 position of the elements which is also shown in FIGS. 6 and 7.

Figure 7:
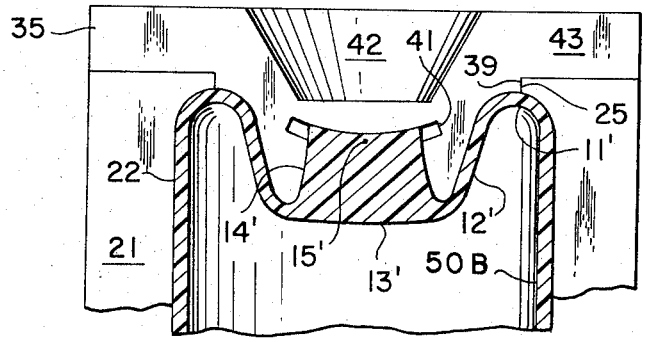
FIG. 7 is a sectional view taken along line 7—7 of FIG. 6, this view also being a front elevational view of a mold half similar to FIGS. 4A and 4B but with the mold assembly in the position as shown in FIG. 3.

Referring now to FIGS. 6 and 7, it will be seen that the smooth adjoining shoulders 24 and 38 form a smooth curve 11'. The smooth outwardly and upwardly sloping curve 37 forms the container upswing portion 12', and the lower curve 36 of the end section 35 which rises up to the plane of 43 forms the container high point 13' and the projection 14', and finally the pinch-off bead 15' is formed in the recess 41.

After the mold section 35 has moved to the position of FIGS. 6 and 7, additional pressurized air is introduced to firmly press the entire container bottom against the end section 35 to firmly shape the same into the final configuration as shown in FIGS. 1A–1C, 6 and 7.

Although the invention has been described in considerable detail with respect to a preferred embodiment, it will be apparent that the invention is capable of numerous modifications and variations apparent to those skilled in the art without departing from the spirit and scope of the invention as defined in the claims.

We claim:

1. A blow molding apparatus for forming a container having an inwardly recessed end, comprising:
   a blow mold having a cavity tubular in shape with an inwardly concave end,
   means for expanding a parison within such cavity into said shape thereof having a tubular portion and an outwardly convex end,
   means for establishing a temperature differential between the convex end and the tubular portion of the blown article to maintain the convex end heated and soft while the tubular portion is maintained sufficiently cooled to have at least some degree of rigidity,
   and means for moving at least a part of the said inwardly concave end of the blow mold into the tubular portion thereof during the existence of the temperature differential to move the outwardly convex end of the blown article into the tubular portion thereof to reverse the curvature of said end to form an essentially outwardly concave end on the blown article.

2. An apparatus according to claim 1, said mold having an end section which includes means for pinching off the parison at the end of said outwardly convex end.

3. An apparatus according to claim 1, said mold having a tubular section forming said tubular portion and an end section for supporting the end of the outwardly convex end, said end section being movable into the tubular section for moving the outwardly convex end of the blown article into the tubular portion.

4. An apparatus according to claim 3, said mold having a neck section between the tubular section and the end section, said neck section being movable out from between the tubular section and the end section thus permitting the movement of the end section into the tubular section.

5. An apparatus according to claim 4, including means for heating the neck section.

6. An apparatus according to claim 4, said end section including means for holding the parison at the end of said outwardly convex end.

7. An apparatus according to claim 6, said end section including a portion forming the end of the mold cavity which is of smaller transverse area than the cross-section of the tubular section, and said neck section being inclined inwardly to smoothly interconnect the tubular section and the end section.

8. An apparatus according to claim 6, said end section including a recessed end portion for receiving the pinched off bead of the parison and a surrounding exterior surface located outside the mold cavity during formation of the blown article, said exterior surface increasing in transverse cross-section away from the said recessed end portion of the end section up to a maximum transverse cross-section which is smaller than a cross-section of the tubular section, said exterior surface adjoining smoothly with the near end of the tubular section to form the sides of the concave container end when the end section is moved into the tubular section.

9. An apparatus according to claim 1, said blow mold including means for forming a small outwardly convex portion within the said essentially outward concave end of the blown article.

10. An apparatus according to claim 9, said blow mold further including means for forming a thick bead at the outer end of said small outwardly convex portion.

11. An apparatus according to claim 1, said means for establishing a temperature differential including a heating means within the mold, and positioned therein for heating the said originally formed outwardly convex end of the blown article.

* * * * *